(12) United States Patent
Ishii

(10) Patent No.: US 12,132,871 B2
(45) Date of Patent: Oct. 29, 2024

(54) IMAGE PROCESSING APPARATUS, IMAGE PROCESSING METHOD, AND STORAGE MEDIUM FOR INSPECTING PRINT PRODUCT

(71) Applicant: CANON KABUSHIKI KAISHA, Tokyo (JP)

(72) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/317,624

(22) Filed: May 15, 2023

(65) Prior Publication Data

US 2023/0379414 A1 Nov. 23, 2023

(30) Foreign Application Priority Data

May 19, 2022 (JP) .................................. 2022-082531

(51) Int. Cl.
*H04N 1/00* (2006.01)

(52) U.S. Cl.
CPC ..... *H04N 1/00068* (2013.01); *H04N 1/00005* (2013.01); *H04N 1/00047* (2013.01); *H04N 1/00074* (2013.01); *H04N 1/00477* (2013.01)

(58) Field of Classification Search
USPC ........................................................ 358/1.12
See application file for complete search history.

(56) References Cited

U.S. PATENT DOCUMENTS

| | | | | |
|---|---|---|---|---|
| 2007/0291286 A1* | 12/2007 | Utsunomiya | ...... | H04N 1/00015 358/1.8 |
| 2011/0179961 A1* | 7/2011 | Yanagawa | ............. | G06F 3/1256 101/483 |
| 2013/0250319 A1* | 9/2013 | Kaneko | .................... | G06T 7/001 358/1.9 |
| 2014/0270397 A1* | 9/2014 | Sochi | ...................... | G06T 7/001 382/112 |
| 2023/0188651 A1* | 6/2023 | Muraishi | .............. | H04N 1/0044 358/406 |

FOREIGN PATENT DOCUMENTS

| | | |
|---|---|---|
| JP | 2010165011 A | 7/2010 |
| JP | 5287272 B2 | 9/2013 |
| JP | 2021130219 A | 9/2021 |
| JP | 2022065551 A | 4/2022 |

* cited by examiner

*Primary Examiner* — Jacky X Zheng
(74) *Attorney, Agent, or Firm* — Canon U.S.A., Inc. IP Division

(57) ABSTRACT

An image processing apparatus includes a calculation unit configured to calculate a first position shift between a reference image serving as a reference for a print product and a first read image obtained by reading the print product, and a second position shift between the reference image and a second read image obtained by reading the print product, and a determination unit configured to determine presence/absence of a position shift in the second read image based on the first position shift and the second position shift.

9 Claims, 10 Drawing Sheets

REFERENCE IMAGE

READ IMAGE

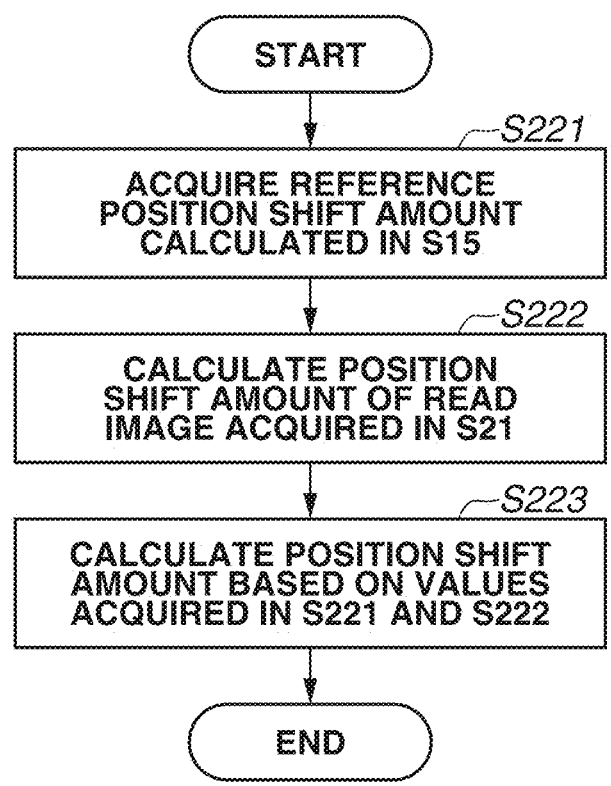

FIG.10

TIMING FOR UPDATING REFERENCE
POSITION SHIFT AMOUNT

- ⦿ AT TIME OF EXECUTION OF INSPECTION PROCESSING ~3101
- ○ AT TIME OF UPDATING OF INSPECTION JOB ~3102
- ○ AT TIME OF REGISTRATION ADJUSTMENT ON BOTH SIDES ~3103

IMAGE PROCESSING APPARATUS, IMAGE PROCESSING METHOD, AND STORAGE MEDIUM FOR INSPECTING PRINT PRODUCT

BACKGROUND OF THE INVENTION

Field of the Invention

The present invention relates to image processing to inspect a print product output from a printing apparatus.

Description of the Related Art

There is a case where a print product output from a printing apparatus has stain due to adherence of a coloring material such as ink and toner to an unintended part, and a shift in print position (hereinafter referred to as a print position shift) with respect to a sheet serving as a print target due to a conveyance speed of the sheet and a shift in print start position. To check the presence/absence of these print defects, there is a method of reading a print product to be output from the printing apparatus with a camera, a line sensor of a scanner, or the like, and automatically inspecting whether print is being normally performed with a read image. In such a method, the presence/absence of a print defect on an inspection target is detected based on a difference between a reference image indicating image data of a print product without any defect and a read image indicating read data of the print product serving as the inspection target. Japanese Patent No. 5287272 discusses a method of extracting a reference edge using original document data, extracting edge image data corresponding to the reference edge from inspection image data, and determining the presence/absence of a position shift based on a shift between the extracted reference edge and the edge image data.

However, in the method described in Japanese Patent No. 5287272, the inspection image data includes a variation and shift in position due to conveyance at the time of print or scan with a scanner, and calculation of a shift from ideal coordinates of the original document data results in a shift amount that is greater than a shift amount between read images.

There is a case where the shift from the ideal coordinates is not important, but a relative shift between sheets being within a reference value is important, such as in a case where a print product having undergone inspection is cut in a stacked state.

In this case, the calculated print position shift becomes greater than the relative shift between sheets. Thus, the method described in Japanese Patent No. 5287272 poses an issue that there is no other choice but to set a greater threshold to be used for determination about the print position shift, and consequently, accuracy in determination about the print position shift decreases.

SUMMARY OF THE INVENTION

The present invention is directed to inspection of the presence/absence of a relative position shift between sheets with high accuracy in comparison between original document data and a read image.

According to an aspect of the present invention, an image processing apparatus includes a calculation unit configured to calculate a first position shift between a reference image serving as a reference for a print product and a first read image obtained by reading the print product, and a second position shift between the reference image and a second read image obtained by reading the print product, and a determination unit configured to determine presence/absence of a position shift in the second read image based on the first position shift and the second position shift.

Further features of the present invention will become apparent from the following description of exemplary embodiments with reference to the attached drawings.

BRIEF DESCRIPTION OF THE DRAWINGS

FIG. 7 is a flowchart of processing in a second position shift amount calculation unit.

FIG. 10 is a diagram illustrating an example of a UI that sets a timing for updating a reference value for a print position shift.

DESCRIPTION OF THE EMBODIMENTS

Exemplary embodiments will be described in detail below with reference to the accompanying drawings. The following exemplary embodiments do not limit the claimed invention. While a plurality of features is described in the exemplary embodiments, not all of these features are necessarily essential to the present invention, and the plurality of features may be freely combined. Furthermore, in the accompanying drawings, an identical or similar component is denoted by an identical reference number, and an overlapping description is omitted. Each process (step) in a flowchart is described with use of a reference number that begins with S.

An image processing apparatus according to a first exemplary embodiment calculates a reference value for a print position shift from a reference image and a read image on the first page, and determines the presence/absence of a print position shift in a read image on the second page or subsequent pages based on the calculated reference value. The image processing apparatus is capable of inspecting the presence/absence of the print position shift between sheets with high accuracy not by determining the print position shift based on a shift amount from ideal coordinates, but by calculating the shift amount from the ideal coordinates and offsetting the print shift amount by the reference value at the time of determination about the print position shift on the second page or subsequent pages.

(Configuration of Print Inspection System)

Figure 1:
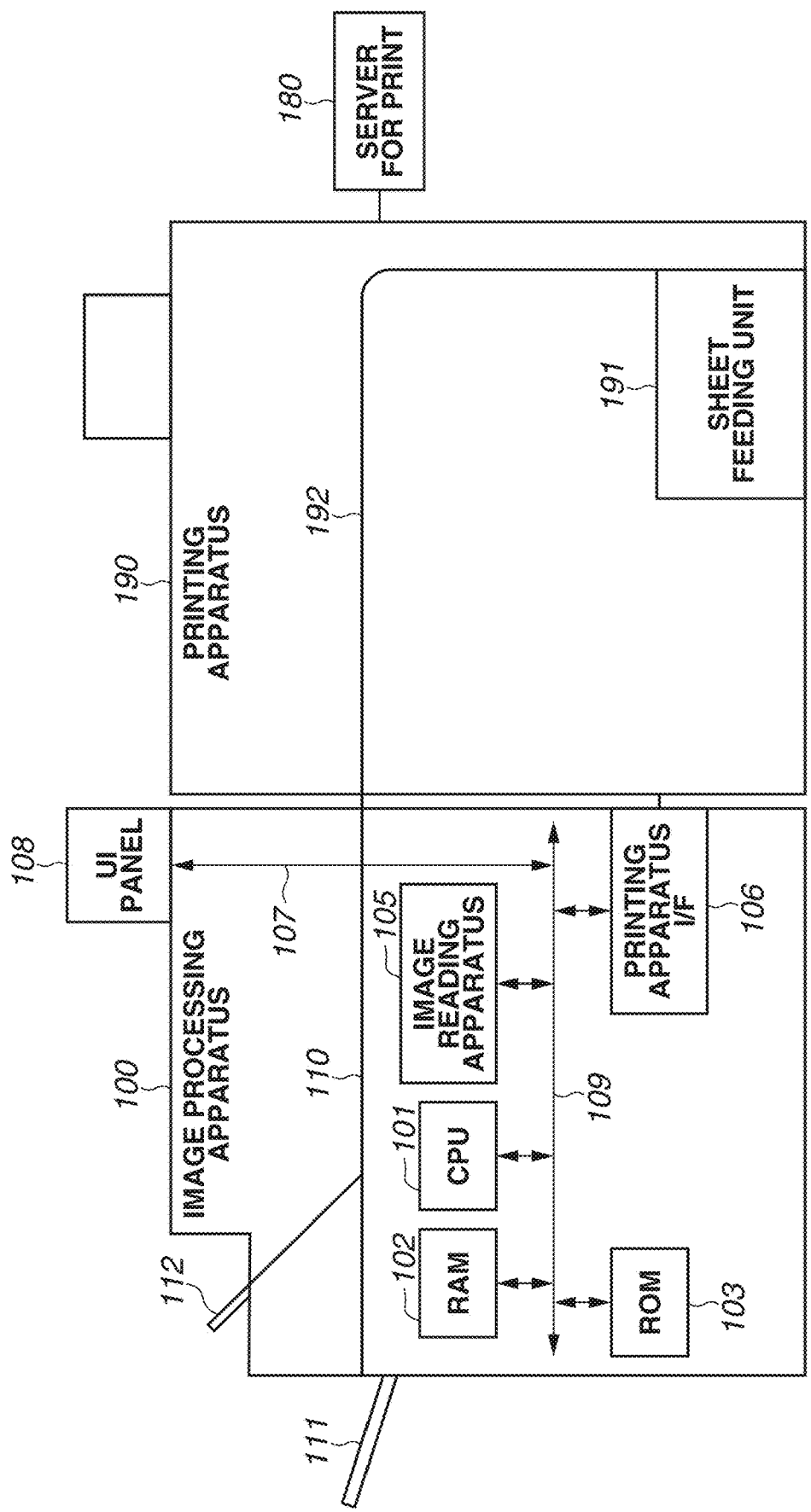
FIG. 1 is a diagram illustrating a configuration example of a print inspection system.

FIG. 1 is a diagram illustrating a configuration of the whole of a print inspection system that includes an image processing apparatus 100 according to the first exemplary embodiment and that outputs and inspects a print product. The print inspection system according to the first exemplary embodiment includes the image processing apparatus 100 and a printing apparatus 190. The print inspection system according to the first exemplary embodiment may further include a server for print 180. In the present exemplary embodiment, a description is given assuming that the image processing apparatus 100 and the printing apparatus 190 are different apparatuses, but the image processing apparatus 100 may be included in the printing apparatus 190.

The server for print 180 generates a print job including an original document to be printed, and inputs the print job to the printing apparatus 190. The printing apparatus 190 forms an image on a print medium based on the print job input from the server for print 180. The printing apparatus 190 includes a sheet feeding unit 191, and a user can preliminarily supply a print sheet to the sheet feeding unit 191. When the print job is input to the printing apparatus 190, the printing apparatus 190 forms an image on one side or both sides of the print medium while conveying the print medium that has been supplied to the sheet feeding unit 191 along a conveying path 192, and sends out the print medium to the image processing apparatus 100.

The image processing apparatus 100 performs defect inspection on the print medium (inspection target medium) on which print has been performed. The inspection target medium is obtained by the printing apparatus 190 forming an image on the print medium, and is conveyed through the conveying path 192 inside the printing apparatus 190. The image processing apparatus 100 may include a central processing unit (CPU) 101, a random-access memory (RAM) 102, and a read-only memory (ROM) 103. The image processing apparatus 100 may include an image reading apparatus 105, a printing apparatus interface (I/F) 106, a general-purpose I/F 107, a UI panel 108, and a main bus 109. Furthermore, the image processing apparatus 100 may include a conveying path 110 for the print medium, which is connected to the conveying path 192 of the printing apparatus 190. The image processing apparatus 100 may include an output tray 111, to which an inspection target medium that is determined to have passed inspection is output, and an output tray 112, to which an inspection target medium that is determined to have failed the inspection is output. In an example in FIG. 1, the output tray 111 and the output tray 112 are connected to the CPU 101 via the main bus 109. The output tray 111 or the output tray 112 is set as a conveyance destination of the inspection target medium depending on a result of the inspection on the inspection target medium.

The image processing apparatus 100 according to each of exemplary embodiments, which will be described below, can be implemented by a computer including a processor and a memory. For example, the processor such as the CPU 101 executes a program stored in the memory such as the RAM 102 or the ROM 103, and can thereby implement functions of each unit. The processor such as the CPU 101 is also capable of controlling each module in the image processing apparatus 100, as necessary. The image processing apparatus 100 according to exemplary embodiments of the present invention may be, for example, composed of a plurality of processing apparatuses connected to each other via a network.

The CPU 101 is a processor that controls each unit in the image processing apparatus 100. The RAM 102 temporarily holds data or the like used for an application executed by the CPU 101 or image processing. The ROM 103 stores a group of programs executed by the CPU 111.

The image reading apparatus 105 scans and reads one side or both sides of the print medium, which has been conveyed from the printing apparatus 190, on the conveying path 110, and acquires read data as image data. The conveying path 110 serves as a background when the image reading apparatus 105 reads an image on the print medium, and thus can be configured to have a color that can be easily distinguished from the print medium on the image (for example, black). The printing apparatus I/F 106 is connected to the printing apparatus 190, and the image processing apparatus 100 can communicating with the printing apparatus 190 via the printing apparatus I/F 106. For example, the printing apparatus 190 and the image processing apparatus 100 are synchronized with each other via the printing apparatus I/F 106, and can be notified of mutual operating states. The UI panel 108 outputs information to the user. The UI panel 108 may be a display device such as a liquid crystal display, and function as a user interface of the image processing apparatus 100. The UI panel 108 is, for example, capable of informing the user of a current state or current settings of the image processing apparatus 100. The UI panel 108 may include an input devices such as a touch panel and buttons, and is capable of accepting an instruction from the user in this manner. The main bus 109 is a transmission path that connects each module of the image processing apparatus 100.

The image processing apparatus 100 performs inspection processing to check the presence/absence of a defect on the print medium based on the image data of the print medium acquired by the image reading apparatus 105 while the print medium output from the printing apparatus 190 is conveyed through the conveying path 110. In a case where it is determined that the print medium has passed the inspection as a result of the inspection processing, the print medium is conveyed to the output tray 111. In a case where it is determined that the print medium has failed the inspection as a result of the inspection processing, the print medium is conveyed to the output tray 112. With such an operation, only the print medium that is determined to have no defect is output onto the output tray 111.

(Configuration of Imaging Processing Apparatus)

Figure 2:
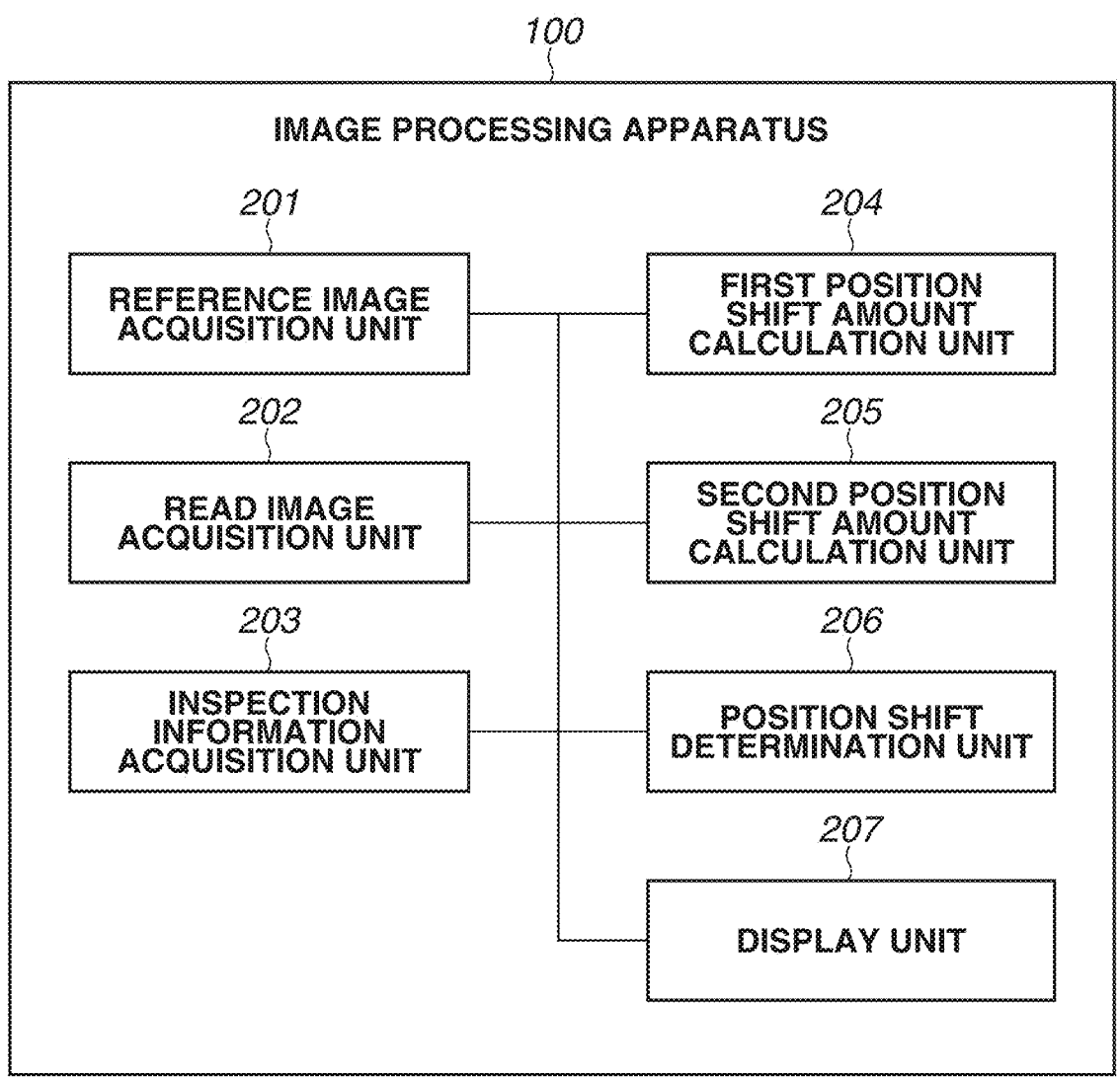
FIG. 2 is a block diagram illustrating a configuration of an image processing apparatus.

FIG. 2 is a block diagram illustrating a configuration of the image processing apparatus 100 according to the present exemplary embodiment.

A reference image acquisition unit 201 reads out and acquires original document data serving as original data of the print product from the RAM 102 or the ROM 103. A read image acquisition unit 202 acquires a read image on the inspection target medium, on which print has been performed by the printing apparatus 190. The acquired image data is held in the RAM 102 or the ROM 103. In the present exemplary embodiment, the read image acquisition unit 202 acquires image data obtained by the image reading apparatus 105 reading the print medium on the conveying path 110. An inspection information acquisition unit 203 acquires information regarding an inspection setting based on an operation or the like that is performed by the user via the UI panel 108. A first position shift amount calculation unit 204 calculates a position shift amount of the read image with respect to an ideal position based on a comparison between the original document data and the read image. A second position shift amount calculation unit 205 calculates a position shift amount of the read image based on a position shift calculated by the first position shift amount calculation unit 204. A position shift determination unit 206 compares the position shift amount of the read image and an inspection setting value regarding the print position shift set via the UI panel 108, and determines the presence/absence of the print position shift in the read image serving as the inspection target.

A display unit 207 displays, on the UI panel 108, a UI for making notification about information to the user and for causing the user to input information necessary for processing.

(Processing Executed by Image Processing Apparatus)

Figure 3:
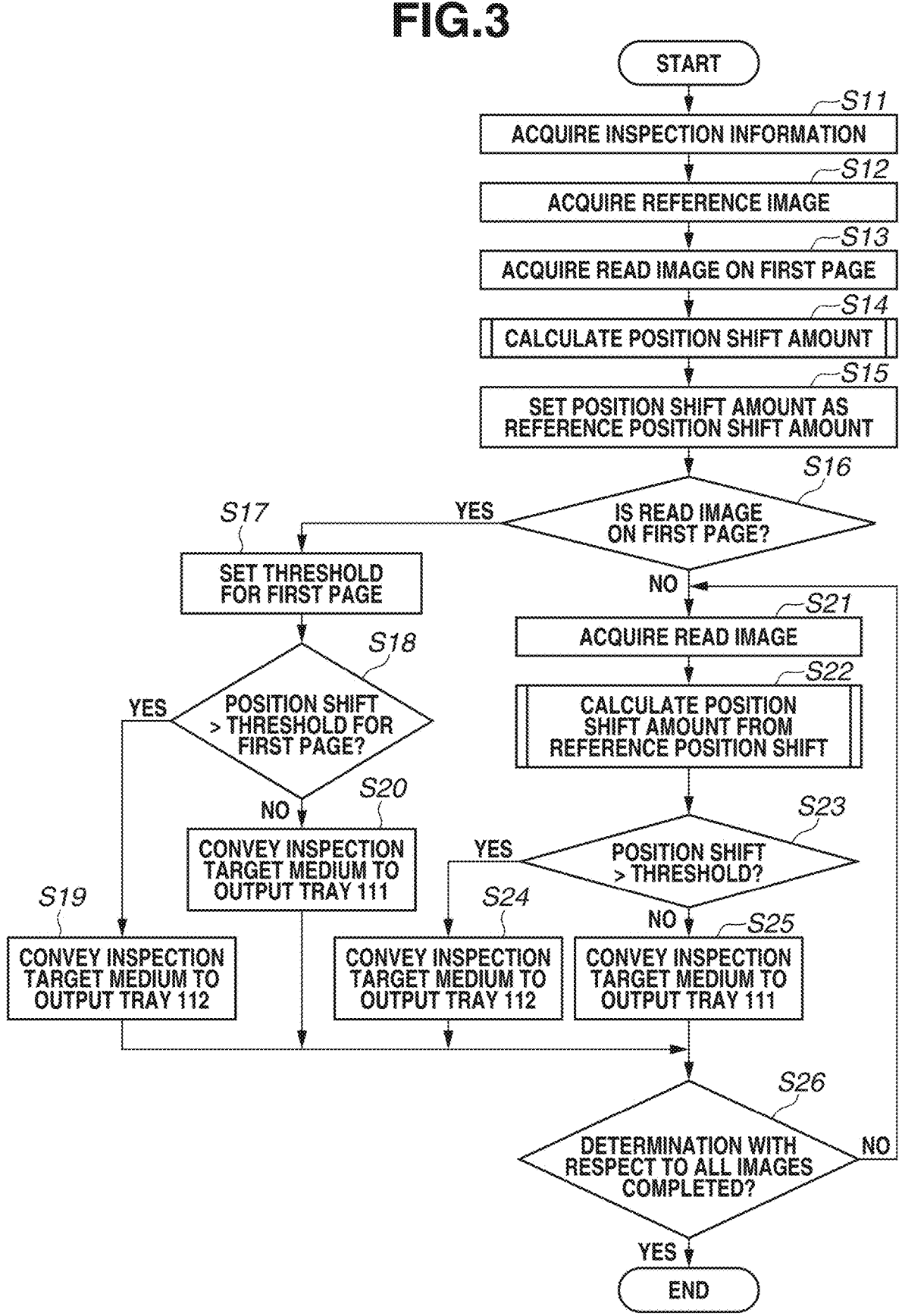
FIG. 3 is a flowchart of image processing.

Processing performed by the image processing apparatus 100 according to the present exemplary embodiment having the above-mentioned configuration will now be described. FIG. 3 is a flowchart describing the flow of processing performed by the image processing apparatus 100.

Figure 4:
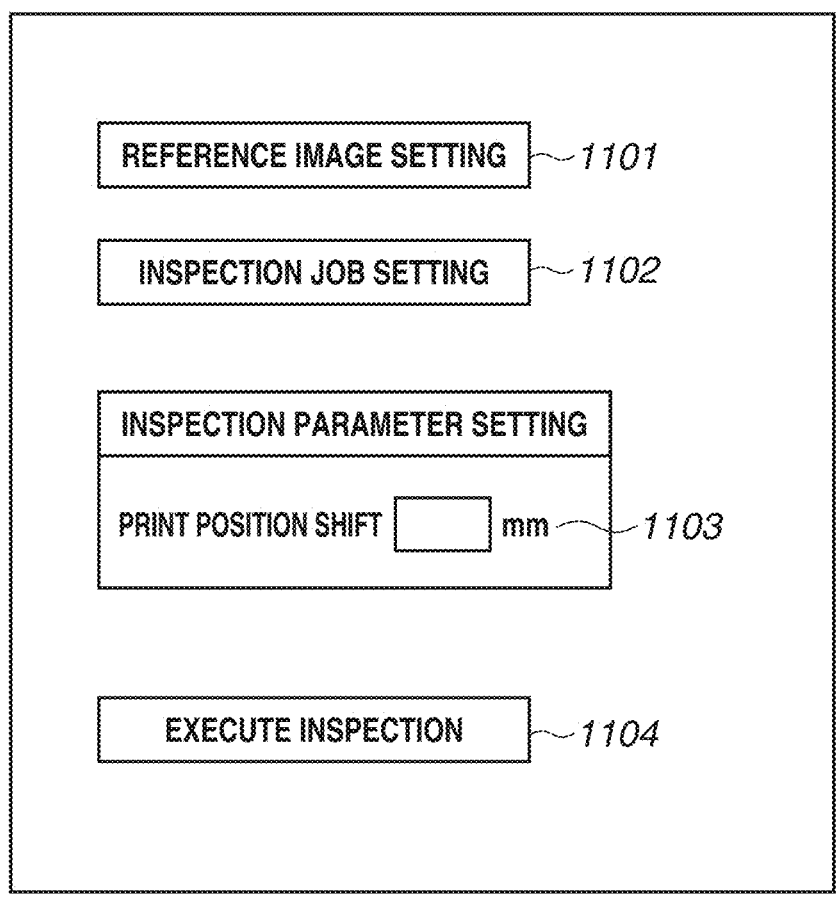
FIG. 4 is a diagram illustrating an example of a user interface (UI) according to a first exemplary embodiment.

In step S11, the inspection information acquisition unit 203 displays, on the UI panel 108, the UI that accepts an instruction from the user to cause the user to input information necessary for inspection, and acquires inspection information based on an operation or the like from the user. FIG. 4 illustrates an example of the UI displayed in step S11.

In FIG. 4, a reference image setting button 1101 is a button for setting the reference image. The user presses the reference image setting button 1101 to designate original document data, which is print original data, as the reference image used for the inspection. The designated image is held in the RAM 102 or the ROM 103.

An inspection job setting button 1102 is a button for setting information about an inspection job associated with the print job, the image data serving as the inspection target, and inspection setting information. The user presses the inspection job setting button 1102 to designate the inspection job associated with the print job and the inspection setting. The designated inspection job is held in the RAM 102 or the ROM 103.

An inspection parameter setting section 1103 is a screen for setting an inspection parameter to be used in the inspection. The user enters a numeric value in an edit box on the screen to set the inspection parameter for the print position shift, and the set vale is held in the RAM 102 or the ROM 103. The present exemplary embodiment is on the assumption that a threshold for the print position shift, which is a threshold for detecting the print position shift, is set. However, for example, inspection parameters corresponding to other print defects such as stain and a density change may be additionally set. Alternatively, the inspection parameter may be set not by entry of the numeric value in the edit box, but by selection of a predetermined value from a pull-down menu. Still alternatively, instead of the numeric value, set levels for inspection are provided and preliminarily held in association with respective thresholds for the print position shift, and a value of the inspection parameter may be acquired according to a level selected by the user.

An inspection execution button 1104 is a button for executing the inspection processing. When the inspection execution button 1104 is pressed, the inspection processing is executed based on the set information.

In step S12, the reference image acquisition unit 201 acquires the original document data, which is the original data of the print product, and stores the original document data in the RAM 102.

In step S13, the read image acquisition unit 202 acquires a read image on the first page among inspection target images registered in the inspection job. The image reading apparatus 105 acquires the read image obtained by reading the inspection target medium on the conveying path 110, and stores the read image in the RAM 102. The image reading apparatus 105 generates the read image by reading the inspection target medium, but the present exemplary embodiment can be applied to a case of using an image acquired by another apparatus. For example, a read image obtained by an apparatus that is different from the image reading apparatus 105 may be stored in an auxiliary storage device (not illustrated). In this case, the read image acquisition unit 202 can acquire the read image from the auxiliary storage device.

In step S14, the first position shift amount calculation unit 204 calculates a print position shift between the reference image acquired in step S12 and the read image acquired in step S13. Details of processing in step S14 will be described below.

In step S15, the first position shift amount calculation unit 204 sets the print position shift amount calculated in step S14 as a reference position shift amount. The reference position shift amount is used as a reference value for offset in the comparison between the reference image and the read image.

In step S16, the image processing apparatus 100 determines whether the read image serving as the inspection target is on the first page. If the read image is on the first page (YES in step S16), the processing proceeds to step S17. If the read image is not on the first page (NO in step S16), the processing proceeds to step S21.

In step S17, the image processing apparatus 100 sets a threshold for determining the print position shift in the read image on the first page. Since the determination about the print position shift on the first page is a comparison between the original document data and the read image and characteristics of the position shift included in the image is different between the original document data and the read image, a calculated shift tends to be large. If the threshold set by the user is applied as it is, it is highly likely that the print product is determined to have failed even when there is no shift between sheets. Thus, the present exemplary embodiment uses a value obtained by adding a maximum print position shift amount of the print inspection system to the threshold set by the user. As the maximum print position shift amount, a maximum value of the print position shift due to conveyance at the time of print or scan with a scanner is set.

While inspection on the second page or subsequent pages is performed by a method that will be described below in a state where the position shift amount is offset by the reference position shift amount, inspection on the first page is performed by adding the maximum print position shift amount to the threshold because the offset is not applied to the first page, whereby the print position shift that poses no problem is prevented from being erroneously determined to have failed the inspection. While the maximum shift amount of a system design value of the print inspection system is added in the present exemplary embodiment, another statistical value such as an average value and a center value may be alternatively used, or a reference value for a print position shift amount calculated in another inspection job, instead of the system design value, may be referred to and added to the threshold.

In step S18, the position shift determination unit 206 compares the position shift amount of the read image on the first image with the threshold set in step S17. If the position shift amount is greater than the threshold (YES in step S18), the processing proceeds to step S19. If the position shift amount is less than or equal to the threshold (NO in step S18), the processing proceeds to step S20.

In step S19, the image processing apparatus 100 performs control to convey the inspection target medium determined to have the print position shift that is greater than the threshold, as an inspection target medium having failed the inspection, to the output tray 112 dedicated to the inspection target medium having failed the inspection.

In step S20, the image processing apparatus 100 performs control to convey the inspection target medium determined to have the print position shift that is less than or equal to the threshold, as an inspection target medium having passed the inspection, to the output tray 111 dedicated to the inspection target medium having passed the inspection.

In step S21, the read image acquisition unit 202 acquires read images on the second page and subsequent pages from the top among the inspection target images registered in the inspection job. The acquired images are stored in the RAM 102.

In step S22, the second position shift amount calculation unit 205 calculates a print position shift amount based on the reference position shift amount calculated in step S14, and the print position shift amount between the reference image acquired in step S12 and the read image acquired in step S21. Details of processing in step S22 will be described below.

In step S23, the position shift determination unit 206 compares the print position shift amount of the read image acquired in step S21 and the threshold for the print position shift acquired in step S11. If the print position shift amount is greater than the threshold (YES in step S23), the processing proceeds to step S24. If the print position shift amount is less than or equal to the threshold (NO in step S23), the processing proceeds to step S25.

In step S24, the image processing apparatus 100 performs control to convey the inspection target medium determined to have the print position shift that is greater than the threshold, as the inspection target medium having failed the inspection, to the output tray 112 dedicated to the inspection target medium having failed the inspection.

In step S25, the image processing apparatus 100 performs control to convey the inspection target medium determined to have the print position shift that is less than or equal to the threshold, as the inspection target medium having passed the inspection, to the output tray 111 dedicated to the inspection target medium having passed the inspection.

In step S26, the image processing apparatus 100 determines whether the determination about the print position shift has been completed with respect to all read images registered in the inspection job. If the there is an image with respect to which the determination has yet been made (NO in step S26), the processing returns to step S21, in which the image processing apparatus 100 acquires a read image. If the determination has been completed with respect to all the images (YES in step S26), the processing ends.

(Operation of First Position Shift Amount Calculation Unit 204 in Step S14)

Figure 5:
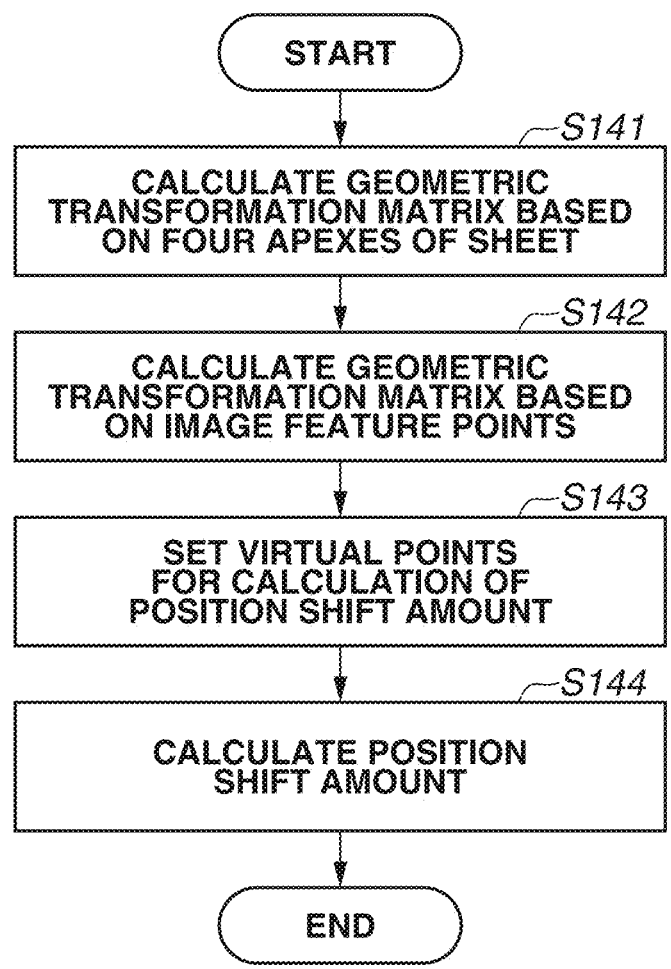
FIG. 5 is a flowchart of processing in a first position shift amount calculation unit.

FIG. 5 is a flowchart regarding processing in the first position shift amount calculation unit 204.

Figure 6A:
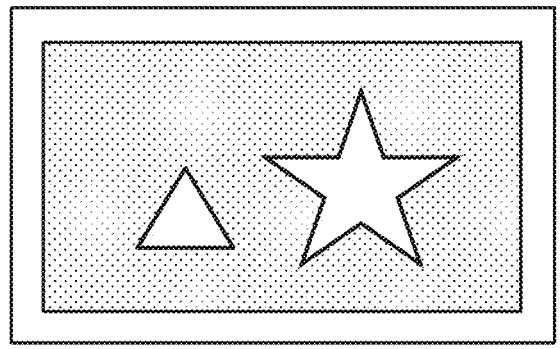
FIG. 6A is a diagram illustrating an example of a reference image.
Figure 6B:
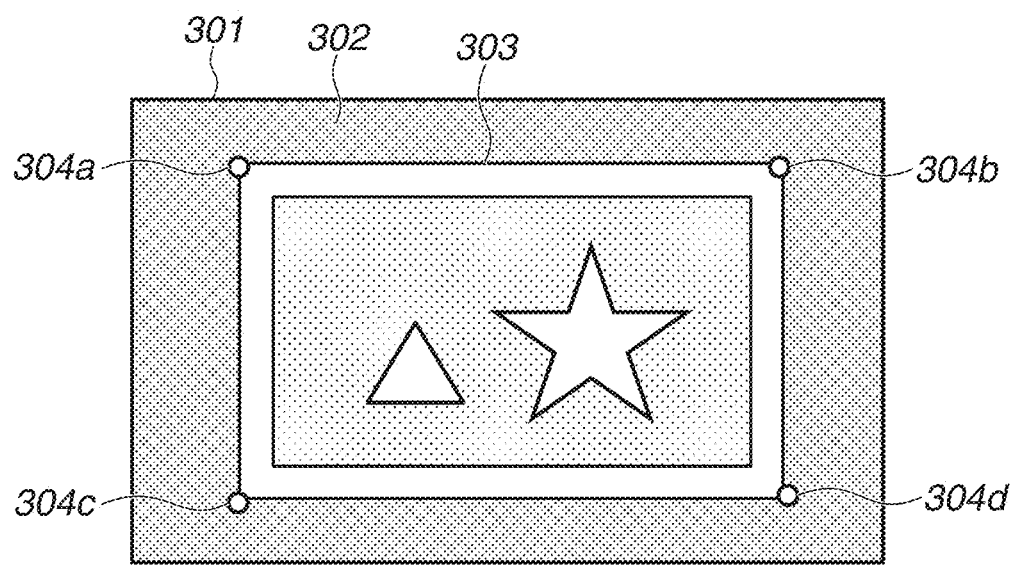
FIG. 6B is a diagram illustrating an example of a read image.

In step S141, the first position shift amount calculation unit 204 calculates four apexes of the reference image and four apexes of a sheet of the read image, and calculates a geometric transformation matrix for alignment. FIG. 6A is a diagram illustrating an example of the reference image. FIG. 6B is a diagram illustrating an example of the read image. A read image 301 includes a print medium region 303 in which the print medium is seen, and a background region 302 in which the print medium is not seen. Since the conveying path 110 is colored in black in the present exemplary embodiment, the background region 302 is colored in black. To calculate the four apexes of the sheet from the read image, the first position shift amount calculation unit 204 first binarizes the read image, tracks pixels that constitute a boundary between white pixels and black pixels, and thereby performs liner approximation of four sides indicating a contour of the print medium to estimate four straight lines indicating the contour of the print medium. Subsequently, the first position shift amount calculation unit 204 calculates an intersection of the estimated four straight lines, and thereby calculates the four apexes of the sheet. The first position shift amount calculation unit 204 calculates the geometric transformation matrix based on coordinates of the calculated four apexes of the sheet of the read image and coordinates of the calculated four apexes of the reference image using the following Expression (1).

$$AX\_c = B \qquad (1)$$
$$X\_c = \begin{pmatrix} x11 & x12 & x13 \\ x21 & x22 & x23 \\ 0 & 0 & 1 \end{pmatrix}$$

In Expression (1), X is an affine transformation matrix, which is calculated from a point group A of the four apexes of the reference image and a point group B of the four apexes of the sheet of the read image.

In step S142, the first position shift amount calculation unit 204 calculates the geometric transformation matrix based on image feature points. To calculate the image feature points, the first position shift amount calculation unit 204 uses a known method such as Scale-Invariant Feature Transform (SIFT) and Speeded-up Robust Features (SURF) to calculate coordinates for alignment indicating feature points of the image, and calculates the geometric transformation matrix based on the image feature points based on the coordinates of the feature points. In the present exemplary embodiment, the first position shift amount calculation unit 204 calculates an affine transformation matrix X_f.

In step S143, the first position shift amount calculation unit 204 sets virtual points for calculating the position shift amount. As the virtual points, four coordinate points away from four corners of the sheet toward the inside by 5 mm (60 pixels in a case of inspection resolution of 300 dpi) are used. The coordinate positions and number of reference points are not limited thereto, but adoption of at least coordinates near the four corners of the sheet stabilizes accuracy in consideration of a scaled component and a rotated component at the time of geometric transformation.

In step S144, the first position shift amount calculation unit 204 calculates a position shift amount. (xi, yi) are coordinates of i virtual points. (xfi, yfi) are coordinates of points transformed using the transformation matrix X_f calculated in step S142. (xci, yci) are coordinates of points transformed using the transformation matrix X_c calculated from the four corners of the sheet. As the print position shift amount, a maximum value of differences in positions of the i virtual points (|xfi−xci|, |yfi−yci|) is used.

The print position shift amount (Δxd, Δyd)

$$\Delta xd = \max(|xfi-xci|), \Delta yd = \max(|yfi-yci|)$$

$$(xfi, yfi) = X\_f(xi, yi), (xci, yxi) = X\_c(xi, yi)$$

While the maximum value of the i differences is used as the print position shift in the present exemplary embodiment, another statistical value such as an average value or mode value of the i differences may be used.

(Operation of Second Position Shift Amount Calculation Unit 205 in Step S22)

FIG. 7 is a flowchart regarding processing in the second position shift amount calculation unit 205.

In step S221, the second position shift amount calculation unit 205 acquires the reference position shift amount ($\Delta xd$, $\Delta yd$) calculated in step S15.

In step S222, the second position shift amount calculation unit 205 calculates a position shift amount ($\Delta xs$, $\Delta ys$) of the read image acquired in step S21. Since the calculation is performed using a method of calculating the position shift amount similar to the method in step S14, a description thereof is omitted.

In step S223, the second position shift amount calculation unit 205 calculates a position shift amount ($\Delta x$, $\Delta y$) using the following expression based on the values acquired in steps S221 and S222.

$$\Delta x = |xs - xd|, \Delta y = |ys - yd|$$

According to the method in the first exemplary embodiment, the reference value for the print position shift is calculated from the reference image and the read image on the first page, and the print position shift is offset by the reference value at the time of determination about the print position shift on the second page or subsequent pages, whereby the presence/absence of the print position shift between sheets can be inspected with high accuracy.

In the first exemplary embodiment, a relative print position shift is determined with reference to the print position shift amount of the read image on the first page at the time of calculation of the print position shift amount of the inspection target image. According to the first exemplary embodiment, in a case where there is few feature points of the read image on the first page, for example, in a case where there is only one image feature point on the first page, only a component for an amount of translation can be calculated, and the scaled component or the rotated component cannot be calculated. Thus, there is a case where the print position shift amount cannot be calculated with high accuracy. To address this, in a second exemplary embodiment, a description will be given of a method of calculating the number of feature points of the read image from which the print position shift with respect to the reference image is calculated, and selecting, if the number of feature points is less than or equal to a threshold, read images each having feature points the number of which exceeds a predetermined number, from the second page to a n-th page (n is a natural number) instead of the first page. The description will be mainly given of a part for calculation of the number of feature points and determination with the threshold, which is a difference from the first exemplary embodiment. Since the other processing is similar to that in the first exemplary embodiment, a description thereof is omitted.

Figure 8:
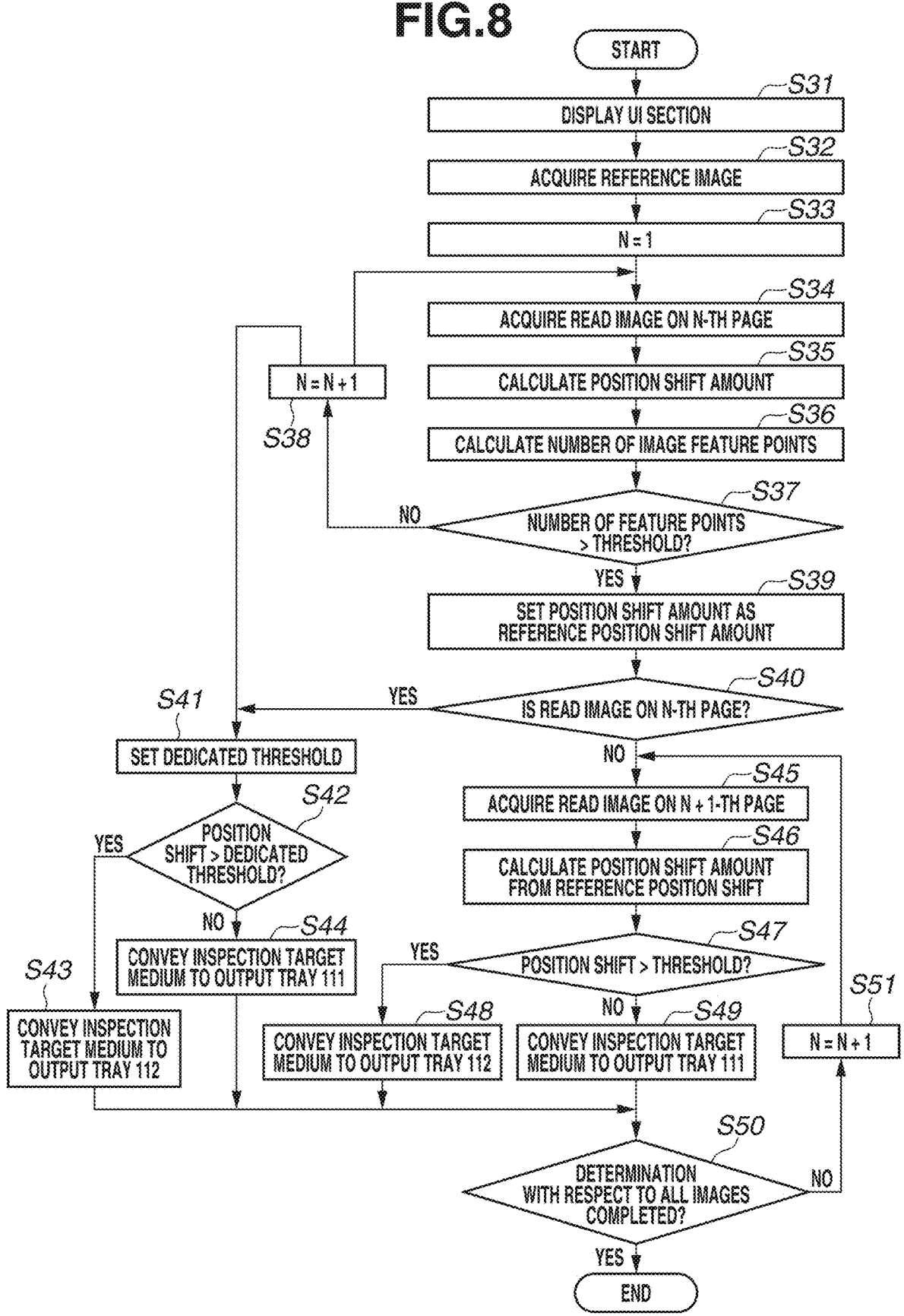
FIG. 8 is a flowchart of image processing according to a second exemplary embodiment.

FIG. 8 is a flowchart describing the flow of processing performed by the image processing apparatus 100.

In step S31, the display unit 207 displays, on the UI panel 108, a UI that accepts an instruction from the user to cause the user to input information necessary for inspection. Since the UI is similar to the UI in the first exemplary embodiment, a description thereof is omitted.

In step S32, the reference image acquisition unit 201 acquires the original document data, which is the original data of the print product, and stores the original document data in the RAM 102.

In step S33, the read image acquisition unit 202 reads out a counter N that represents the number of pages from the top page of sheets and is stored in the RAM 102, and sets N at 1.

In step S34, the read image acquisition unit 202 acquires the counter N from the RAM 102, and acquires a read image on the N-th page.

In step S35, the first position shift amount calculation unit 204 calculates the print position shift between the reference image and the read image on the N-th page using a method similar to the processing method used in step S14 described above.

In step S36, the read image acquisition unit 202 calculates the number of image feature points of the read image acquired in step S34. In the present exemplary embodiment, the read image acquisition unit 202 utilizes corner information of the image as the feature points, detects corners using a known algorithm such as Harris corner detection, and extracts a plurality of feature points in descending order of feature amounts. For calculation of the feature points, another algorithm such as the SIFT may be used or a value manually set by the user from image data may be used.

In step S37, the read image acquisition unit 202 compares the number of feature points calculated in step S36 and a predetermined threshold. If the number of feature points is greater than the threshold (YES in step S37), the processing proceeds to step S39. If the number of feature points is less than or equal to the threshold (NO in step S37), the processing proceeds to step S38. While the predetermined threshold is set at 5 to extract six or more feature points in the present exemplary embodiment, a numeric value is not limited thereto, and a greater number of feature points may be set or a smaller numeric value may be set. However, since the scaled component and the rotated component cannot be calculated without at least three or more feature points due to the nature of the geometric transformation matrix, the threshold of 2 or greater at minimum is preferably set.

In step S38, the read image acquisition unit 202 increments the counter N representing the number of pages from the top page of the sheets. Since the number of feature points does not satisfy the condition after the increment, the processing returns to step S34, in which the read image acquisition unit 202 repeats the processing of determining the number of feature points of the read image until finding a read image having feature points the number of which exceeds the threshold. Regarding the read image having feature points the number of which is less than or equal to the threshold, the processing proceeds to step S41, in which the image processing apparatus 100 determines the presence/absence of the print position shift with the threshold described in step S17.

In step S39, the first position shift amount calculation unit 204 sets the print position shift amount calculated in step S35 with respect to the read image having feature points the number of which exceeds the threshold, as the reference position shift amount.

In step S40, the image processing apparatus 100 reads out the counter N from the RAM 102, and determines whether the read image serving as the inspection target is on the N-th page. If the read image is on the N-th page (YES in step S40), the processing proceeds to step S41. If the read image is not on the N-th page (NO in step S40), the processing proceeds to step S45.

In step S41, the image processing apparatus 100 sets a threshold for determining the print position shift in the read image on the N-th page. A method for setting the threshold is similar to the method described in step S17.

In step S42, the position shift determination unit 206 compares the position shift amount of the read image on the N-th image with the threshold set in step S41. If the position shift amount is greater than the threshold (YES in step S42), the processing proceeds to step S43. If the position shift amount is less than or equal to the threshold (NO in step S42), the processing proceeds to step S44.

In step S43, the image processing apparatus 100 performs control to convey the inspection target medium determined to have the position shift that is greater than the threshold, as the inspection target medium having failed the inspection, to the output tray 112.

In step S44, the image processing apparatus 100 performs control to convey the inspection target medium determined to have the position shift that is less than or equal to the threshold, as the inspection target medium having passed the inspection, to the output tray 111.

In step S45, the read image acquisition unit 202 reads out the counter N from the RAM 102, and acquires a read image on the N+1-th page.

In step S46, the second position shift amount calculation unit 205 calculates the print position shift amount using the method described above in step S22 based on the position shift amount set in step S39, and the print position shift amount between the reference image acquired in step S32 and the read image acquired in step S45.

In step S47, the position shift determination unit 206 compares the position shift amount of the read image acquired in step S45 and the threshold set by the user. If the position shift amount is greater than the threshold (YES in step S47), the processing proceeds to step S48. If the position shift amount is less than or equal to the threshold (NO in step S47), the processing proceeds to step S49.

In step S48, the image processing apparatus 100 performs control to convey the inspection target medium determined to have the position shift that is greater than the threshold, as the inspection target medium having failed the inspection, to the output tray 112.

In step S49, the image processing apparatus 100 performs control to convey the inspection target medium determined to have the position shift that is less than or equal to the threshold, as the medium having passed the inspection, to the output tray 111.

In step S50, the image processing apparatus 100 determines whether the determination about the print position shift has been completed with respect to all read images. If the there is an image with respect to which the determination has yet been made (NO in step S50), the processing returns to step S51. If the determination has been completed with respect to all the images (YES in step S50), the processing ends.

In step S51, the image processing apparatus 100 increments the counter N representing the number of pages from the top page of the sheets.

In a case where the number of feature points in an image is small, the accuracy in calculation of the print position shift decreases. To address this, according to the method in the second exemplary embodiment, setting the determination with the threshold for the number of feature points with respect to the image at the time of calculation of the reference position shift amount enables the inspection of the presence/absence of the print position shift with high accuracy, as described above.

In the first and second exemplary embodiments, the read image used when the reference value for the print position shift is calculated is determined by the processing in the image processing apparatus 100. In a third exemplary embodiment, a description will be given of a method of causing the user to select a read image serving as a target used when the reference value is calculated. In the description of the method according to the third exemplary embodiment, a UI section that is displayed in step S11, which is a difference from the above-mentioned exemplary embodiments, will be described with reference to FIG. 9. Since the other processing is similar to that in the above-mentioned exemplary embodiments, a description thereof is omitted.

Figure 9:
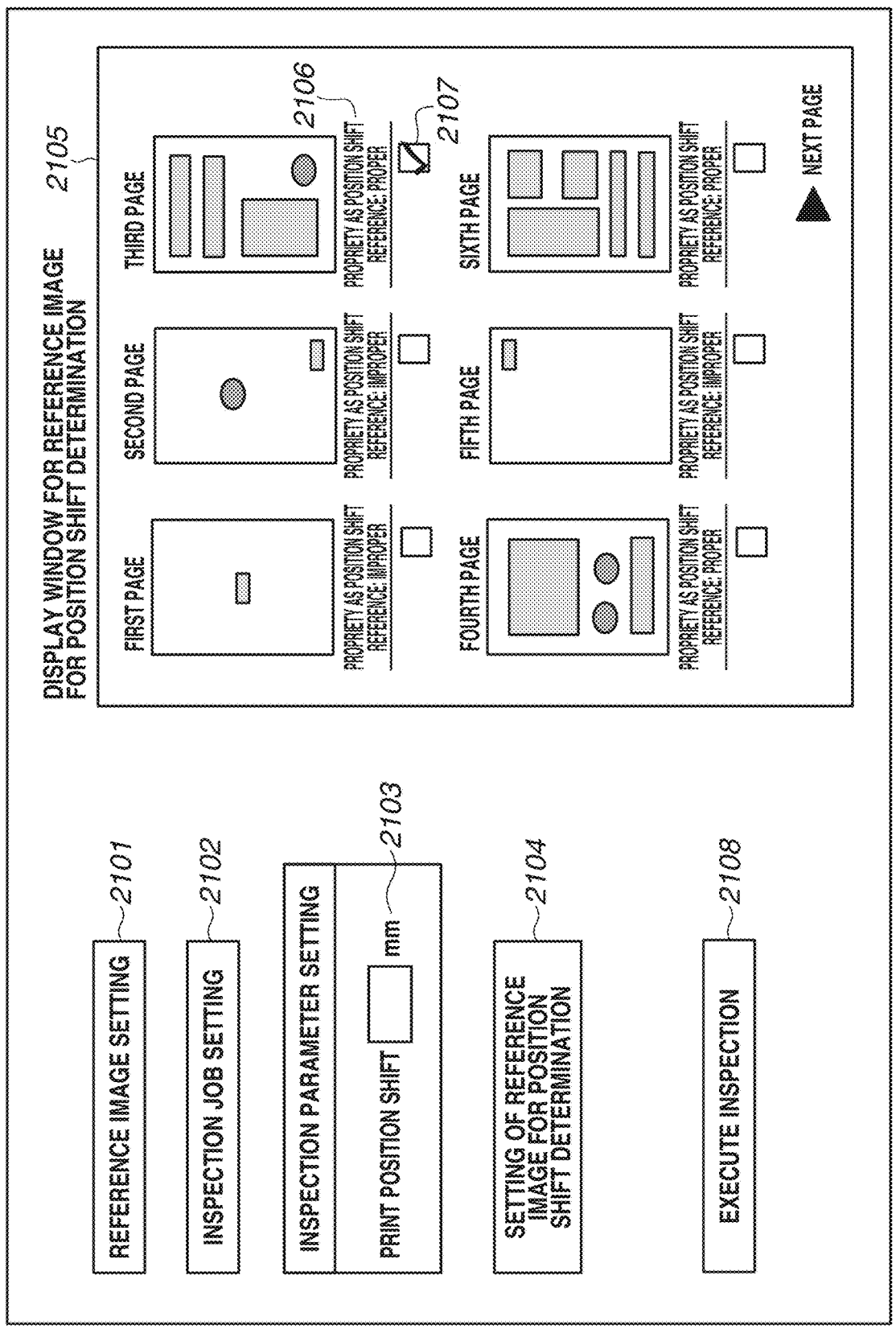
FIG. 9 is a diagram illustrating a UI according to a third exemplary embodiment.

In FIG. 9, a reference image setting button 2101 is a button for setting the reference image. The user presses the reference image setting button 2101 to designate the original document data, which is the print original data, as the reference image to be used for the inspection. An inspection job setting button 2102 is a button for setting job information into which image data serving as the inspection target is collected. The user presses the inspection job setting button 2102 to designate the inspection job associated with a plurality of print images and a print setting. An inspection parameter setting section 2103 is a screen for setting an inspection parameter used in the inspection. The user enters a numeric value in an edit box on the screen to set the inspection parameter for the print position shift. A button 2104 for setting of a reference image for position shift determination is a button for setting an image to be used for calculation of a reference value for position shift determination. When the user presses the button 2104, the image data serving as the inspection target set by the inspection job setting button 2102 is displayed on a display window section 2105. The display window section 2105 is a window that displays read images serving as the inspection target set in the inspection job. When the user presses the button 2104, the read images serving as the inspection target set in the inspection job are sequentially displayed as a list from the first page. A position shift reference propriety notification section 2106 is a text box that displays whether each image displayed on the display window section 2105 is proper as the reference image for the position shift determination. If the image is proper, "PROPER" is displayed below the image as a candidate image. If the image is improper, "IMPROPER" is displayed below the image. The determination about whether the image is proper is made depending on whether the number of feature points of the read image is greater than the predetermined number, which has been described in the second exemplary embodiment. Since the determination method is similar to that in the second exemplary embodiment, a description thereof is omitted. A reference image selection section 2107 is a check box for selecting the reference image. The user checks a check box corresponding to the reference image to be used for the position shift determination to set the reference image.

The reference image to be used for calculation of the reference position shift amount described in the first and second exemplary embodiments is determined based on the reference image set therein by the user. An inspection execution button 2108 is a button for executing the inspection processing. When the inspection execution button 2108 is pressed, the inspection processing is executed based on the set information.

As described above, the method according to the third exemplary embodiment causes the user to select the image to be used for calculation of the reference value for the print position shift, and thereby enables inspection of the presence/absence of the print position shift with high accuracy.

Other Exemplary Embodiments

[Method of Calculating Reference Value for Print Position Shift]

While the reference value for the print position shift is calculated by the comparison between the read image on the first page and the original document data in the first exemplary embodiment, position shift values may be calculated from the first page to a predetermined page and the reference value may be calculated from a statistical value such as an average value or mode value of the calculated position shift values.

[Timing for Updating Reference Value for Print Position Shift]

While the inspection job is referred to every time inspection is executed and the reference value for the print position shift is calculated from the original document data and the reference value every time in the first and second exemplary embodiments, the reference value calculated when the first inspection is executed may be stored in the ROM 103, and may be read out as necessary to be used for inspection. For example, a UI for setting a timing for updating the reference value can be provided as illustrated in FIG. 10, and the reference value may be updated at the set timing. In FIG. 10, the timing at which the user updates the reference value can be selected by a radio button, and the reference value can be updated at the selected timing.

When a radio button 3101 for "AT TIME OF EXECUTION OF INSPECTION PROCESSING" is selected, the reference value for the print position shift is calculated and set every time inspection is executed as described in the above-mentioned exemplary embodiments. When a radio button 3102 for "AT TIME OF UPDATING OF INSPECTION JOB" is selected, the reference value used for the inspection job executed once is stored in the ROM 103, and the stored reference value is used when the identical job is executed. In a case where the inspection job is updated, the reference value for the print position shift is newly calculated and set assuming that the read image to be used for inspection is changed, but the reference value used for the previous inspection is used unless the inspection job is updated.

When a radio button 3103 for "AT TIME OF REGISTRATION ADJUSTMENT ON BOTH SIDES" is selected, the reference position shift amount is updated at an execution timing of registration adjustment on both sides, which is adjustment by moving the whole print range from side to side and up and down in a case where there is a print position shift on both sides of the print product.

The present invention is directed to inspection of the presence/absence of the relative position shift between sheets with high accuracy in the comparison between the original document data and the read image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-082531, filed May 19, 2022, which is hereby incorporated by reference herein in its entirety.

What is claimed is:

1. An image processing apparatus comprising:
one or more processors that are configured to:
set, as a reference position shift amount, a first position shift amount between a reference image serving as a reference for inspection and a first read image obtained by reading a first print product;
calculate a second position shift amount between the reference image and a second read image obtained by reading a second print product which is different from the first print product;
determine presence/absence of a position shift in the second read image based on the reference position shift amount and the second position shift amount; and
determine presence/absence of a position shift in the first read image by comparing the first position shift amount with a value obtained by adding a maximum printing position shift amount to a threshold value.

2. The image processing apparatus according to claim 1, wherein the first read image is a read image on a first page set in a print job.

3. The image processing apparatus according to claim 1, wherein the one or more processors are further configured to determine the presence/absence of the position shift from a statistical value of position shift amounts from a first page to n-th page set in a print job, where n is a natural number.

4. The image processing apparatus according to claim 1, wherein the first read image is an image having feature points the number of which is greater than a threshold, as a result of calculation of the feature points of the first read image.

5. The image processing apparatus according to claim 1, wherein, among a plurality of the first read images, an image having a large number of feature points is notified to a user as a candidate image for the first read image.

6. The image processing apparatus according to claim 1, wherein the first read image is an image set based on an instruction from a user.

7. The image processing apparatus according to claim 1, wherein the one or more processors are further configured to determine presence/absence of a position shift in the second read image by subtracting the reference position shift amount from the second position shift amount.

8. An image processing method comprising:
setting, as a reference position shift amount, a first position shift amount between a reference image serving as a reference for inspection and a first read image obtained by reading a first print product;

calculating a second position shift amount between the reference image and a second read image obtained by reading a second print product which is different from the first print product;

determining presence/absence of a position shift in the second read image based on the reference position shift amount and the second position shift amount; and determining presence/absence of a position shift in the first read image by comparing the first position shift amount with a value obtained by adding a maximum printing position shift amount to a threshold value.

9. A non-transitory computer-readable storage medium storing instructions that, when executed by a computer, cause the computer to perform an image processing method, the method comprising:

setting, as a reference position shift amount, a first position shift amount between a reference image serving as a reference for inspection and a first read image obtained by reading a first print product;

calculating a second position shift amount between the reference image and a second read image obtained by reading a second print product which is different from the first print product;

determining presence/absence of a position shift in the second read image based on the reference position shift amount and the second position shift amount; and determining presence/absence of a position shift in the first read image by comparing the first position shift amount with a value obtained by adding a maximum printing position shift amount to a threshold value.

* * * * *